United States Patent [19]
Frechtling

[11] 3,892,822
[45] July 1, 1975

[54] RECONSTITUTABLE VINYL ACETATE POLYMER POWDERS FROM NON-AQUEOUS DISPERSION

[75] Inventor: Arthur C. Frechtling, Watchung, N.J.

[73] Assignee: Union Carbide Corporation, New York, N.Y.

[22] Filed: Feb. 20, 1974

[21] Appl. No.: 443,989

[52] U.S. Cl. ................. 260/875; 260/29.6 RW
[51] Int. Cl. .................. C08f 15/20; C08f 37/04
[58] Field of Search .................................. 260/875

[56] References Cited
UNITED STATES PATENTS

| | | | |
|---|---|---|---|
| 2,504,052 | 4/1950 | Snyder | 260/875 |
| 2,671,065 | 3/1954 | Ulrich | 260/875 |
| 3,092,600 | 6/1963 | Ozawa et al. | 260/29.6 H |

FOREIGN PATENTS OR APPLICATIONS

| | | | |
|---|---|---|---|
| 1,171,157 | 5/1964 | Germany | 260/875 |

*Primary Examiner*—Murray Tillman
*Assistant Examiner*—Thurman Kennis Page
*Attorney, Agent, or Firm*—B. F. Crowe

[57] ABSTRACT

Vinyl acetate polymer powders have been prepared which are readily converted to latices with water. Their preparation is accomplished by first copolymerizing vinyl acetate with a small amount of a dialkyl fumarate in an non-aqueous dispersion polymerization system followed by polymerization of a small amount of methacrylic acid onto the surface of each particle in the non-aqueous dispersion. The final step involves treating the polymer particles thus formed with about a stoichiometric amount of a tertiary amine, diamine, or tetralkylene diamine. The powders thereby obtained readily formed stable latices upon addition of water.

9 Claims, 1 Drawing Figure

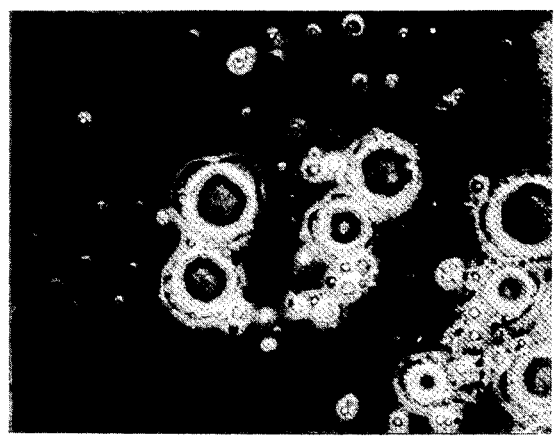

RECONSTITUTABLE VINYL ACETATE POLYMER POWDERS FROM NON-AQUEOUS DISPERSION

BACKGROUND OF THE INVENTION

This invention relates to vinyl acetate polymer powders which are readily convertible to latices with water and more particularly to the preparation of said vinyl acetate powders.

Vinyl acetate polymer coatings have received wide acceptance in commerce because of their excellent adhesion, pigment binding, light and heat stability and grease resistance. Large volumes of such polymer coatings are sold annually as a latex for use in paint formulations. Despite the advantage of employing latices over organic solutions many of which are toxic air pollutants, inflammable and cause cobwebbing upon application, previously available latices too have their disadvantages. For example latices often require wetting agents and special containers. They also present the problem of poor freeze-thaw stability and require high heats of vaporization. An additional consideration is shipping costs which are increased by the volume of water used. Interest therefor has developed in the preparation, sale, and use of vinyl acetate polymer powders which can be shipped dry and then converted to a latex by the addition of water for such uses as paints, adhesives, spackling compounds and tape joint compounds.

BRIEF DESCRIPTION OF THE DRAWING

The sole FIGURE is a photomicrograph of the dispersion produced from an embodiment of the present invention.

SUMMARY OF THE INVENTION

It has now been found that vinyl acetate polymer powders capable of being converted to stable latices can be prepared by a method which comprises;

a. rapidly adding with agitation in one continuous operation about 3 to about 8 parts by weight of methacrylic acid to a stable non-aqueous dispersion containing 100 parts by weight of a vinyl acetate/dialkyl fumarate copolymer containing about 0.5 to about 6 percent by weight of dialkyl fumarate copolymerized therein, wherein the alkyl groups contain about 8 to 18 carbon atoms, in an organic diluent selected from the class consisting of aliphatic hydrocarbons containing from about 4 to 12 carbon atoms and alicyclic hydrocarbons containing from about 5 to 8 carbon atoms, at a temperature of about 20° to about 150°C in the presence of a polymerization initiating amount of a free radical polymerization initiator;

b. maintaining a temperature of about 20° to about 150°C for at least about 5 minutes whereby methacrylic acid is graft polymerized onto the surface of the vinyl acetate/dialkyl fumarate copolymer;

c. neutralizing the carboxyl groups of the methacrylic acid with about a stoichiometric amount of an organic amine selected from the group consisting of (1) trialkyl amines having the formula

wherein each of $R_1$, $R_2$, and $R_3$ is an alkyl group having about 4 to about 10 carbon atoms, (2) tetraalkyl alkylene diamines having the formula

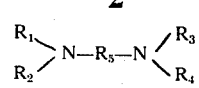

wherein each of $R_1$, $R_2$, and $R_3$, is as described above, $R_4$ is an alkyl group having about 4 to about 10 carbon atoms and $R_5$, is an alkylene radical having about 2 to about 10 carbon atoms and (3) a diamine having the formula

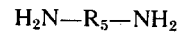

wherein $R_5$ is as defined above; and d. recovering and drying the resultant product.

The vinyl acetate/dialkyl fumarate copolymers may be prepared in non-aqueous dispersion by heating and agitating, under an inert atmosphere, a mixture of vinyl acetate monomer and from about 0.5 to 6 parts by weight, per 100 parts of vinyl acetate monomer, of a dialkyl fumarate monomer having about 8 to 18 carbon atoms in each alkyl group, said monomer mixture being dissolved in about 37 to 900 parts by weight per 100 parts vinyl acetate monomer, of an organic diluent selected from the class consisting of aliphatic hydrocarbons containing from about 4 to 12 carbon atoms and alicyclic hydrocarbons containing from about 5 to 8 carbon atoms with about 0.01 to 1.0 parts by weight, per 100 parts of monomer mixture, of a free radical polymerization initiator at a temperature of about 0° to 150°C for at least about 2 hours until a stable, non-aqueous vinyl acetate/dialkyl fumarate copolymer dispersion is obtained.

It has been found that the average particle size of the vinyl acetate/dialkyl fumarate copolymers in the non-aqueous dispersions formed range from about 0.05 to 50 microns. It is preferred to obtain copolymers with average particle sizes in the range of about 0.1 to 10 microns with the range of about 0.3 to 5 microns being particularly preferred.

Polymerization time is not narrowly critical and varies with the activity of the monomers being polymerized. As a rule, under the conditions outlined above, the first visible signs of polymerization, as evinced by a transition from a mere homogeneous solution of the monomers in the reaction vessel to a cloudy solution, takes about 5 to 40 minutes. The upper limit of polymerization time is not critical since further heating at the polymerization temperature beyond that time required for substantially complete conversion of the monomer does not harm the quality of the polymer product. As a practical range it is preferred to employ a polymerization time of about 2 hours to about 24 hours with a range of about 2 to 20 hours being preferred.

Although temperatures of about 20° to 150° may be used for the copolymerization of the methacrylic acid monomer with the vinyl acetate copolymer dispersed in the non-aqueous diluent, it is preferred to use the range of about 25° to 125°C., more preferred to use the range of about 40° to 100°C. and most preferred to use the range of about 50° to 80°C.

Polymerization pressure is not critical and although atmospheric pressures are preferred for economical reasons, super-atmospheric as well as subatmospheric pressures can also be used if desired.

Any free radical polymerization initiator known in the art for the polymerization of ethylenically unsaturated monomers may be used in the practice of this invention including organic peroxides, such as, benzoyl peroxide, lauroyl peroxide, capryloyl peroxide, diacetyl peroxide, tertiary butyl peroxy pivolate, tertiary butyl peroxide, tertiary butyl hydroperoxide, and the like; organic azo compounds, such as, azobisisobutyronitrile, α, α'-azodicyclohexanecarbonitrile, azobis-α, α-dimethylvaleronitrile, dimethyl-α, α'-azodiisobutyrate and the like; and dialkyl peroxy dicarbonates, such as, diisopropyl peroxy dicarbonate, and the like. Although polymerization initiator concentrations in the range of about 0.01 to 1.0 parts by weight per 100 parts of monomer mixture can be used, a range of about 0.05 to about 0.5 is preferred with a range of about 0.1 to 0.3 being particularly preferred.

Exemplary of the dialkyl fumarates which can be used in the practice of this invention are di-2-ethylhexyl fumarate, di-n-octyl fumarate, di-n-nonyl fumarate, di-n-decyl fumarate, di-n-dodecyl fumarate, di-n-tridecyl fumarate, di-n-tetradecyl fumarate, di-n-hexadecyl fumarate, di-n-octadecyl fumarate, and the like.

The amount of dialkyl fumarate used to form the vinyl acetate copolymers of this invention is small, namely, about 0.05 to 6 percent of the total vinyl acetate copolymer because the function of this comonomer is to provide an internal dispersing or interfacial agent thus making the resultant copolymer permanently dispersible in non-aqueous media without materially changing the physical and chemical properties of the polymerized vinyl acetate comonomer which constitutes the large bulk of the copolymer. It is therefore preferred to use a minimum amount of dialkyl fumarate copolymerized in the vinyl acetate copolymer. It is preferred to use about 1 to 5 parts of dialkyl fumarate per 100 parts of vinyl acetate monomer, more preferred to use about 1 to 4 parts of dialkyl fumarate, and most preferred to use about 1 to 3 parts of dialkyl fumarate.

It is postulated, although it is to be understood that the instant invention is not limited to any particular theory or explanation, that the polymerization of methacrylic acid with the vinyl acetate/dialkyl fumarate copolymer dispersion results in a sheathing of polymethacrylic acid surrounding each dispersed particle of vinyl acetate/dialkyl fumarate copolymer. In this regard completely unexpected observations were made. First of all the choice of methacrylic acid monomer for this step of the invention is critical inasmuch as even the closely related homolog, acrylic acid, is not a satisfactory substitute, the latter resulting in a final product which affords seedy or grainy films. Secondly, the mode of addition of the methacrylic acid monomer to the vinyl acetate/dialkyl fumarate copolymer dispersion is also critical, inasmuch as, one must add methacrylic acid monomer rapidly in one complete addition to the aqueous dispersion of vinyl acetate/dialkyl fumarate copolymer in order to obtain satisfactory results. If one adds the methacrylic acid, as one in the art would normally be expected to do, that is, in incremental additions or dropwise, the resultant particles of resin do not readily disperse into homogeneous latices but rather afford seedy products both in the latice and when the latice is converted to a coating or film. This mode of addition is difficult to express quantitatively because a bare expression of time units is meaningless alone. Thus, for example, the time required to add a gram of methacrylic acid to 100 cc of vinyl acetate copolymer dispersion might be of the order of a fraction of a second whereas hours would be required to add a ton of methacrylic acid to 100 tons of vinyl acetate copolymer dispersion because of the sheer magnitude of the two masses involved. The times given therefor in the description of the invention and in the claims are relative to the amounts of both methacrylic acid and vinyl acetate copolymer dispersion recited there and it is understood that these figures can be extrapolated without changing the nature of the invention itself. It can also be visualized that sophisticated agitation and mixing methods such as high speed and high shear stirrers, all well known to those skilled in the art, can influence and lower the actual time values required for mixing methacrylic acid with vinyl acetate copolymer dispersions. The simplest way of describing this phenomenon is to say that the polymerization step involving polymerizing methacrylic acid onto the particles of vinyl acetate/dialkyl fumarate copolymer dispersion should be effected as rapidly as possible.

Inasmuch as the particles of vinyl acetate/dialkyl fumarate copolymer after being sheathed with polymethacrylic acid are not convertible in this form to an aqueous latex with water, it has been found necessary to neutralize the pendant carboxyl groups of the polymethacrylic acid sheathed particles with about a stoichiometric amount of an organic amine hereinbefore described. It is not critical that a quantitative neutralization be effected but it is desired that the neutralization be as complete as possible. To this end it is therefor desirable to employ a stoichiometric amount of said organic amine although smaller amounts and larger amounts can also be used. For example in the case of excess amounts the excess serves no purpose but has no deleterious effect on the overall properties of the resultant product. Organic amines which have been found satisfactory for the stoichiometric reaction include tertiary amines such as tributyl amine, triamyl amine, trihexyl amine, triheptyl amine, trioctyl amine, trinonyl amine, tridecyl amine, and the like; tetraalkyl alkylene diamines such as tetrabutyl ethylenediamine, tetraamyl ethylenediamine, tetrahexyl ethylenediamine, tetraheptyl ethylenediamine, tetradecyl ethylenediamine, in N,N'-tetrabutyl-1,3-propylene diamine, N,N-tetraamyl-1,3-propylene diamine, N,N'-tetraoctyl-1,3-propylene diamine, and the like; and diamines such as butylenediamine, amylenediamine, hexylenediamine, heptylenediamine, decylenediamine, and the like.

The amines useful in this invention are non-solvents for the vinyl acetate/dialkyl fumarate copolymers employed.

Amines containing lower alkyl or alkylene groups cannot be used since they are too volatile and therefore evaporate from the polymers on standing. The polymers then revert to the original non-reconstitutable form. Mono and dialkyl amines will neutralize the methacrylic acid sheathed copolymers but they are unsatisfactory because they impart strong coloration to the polymers upon standing.

It is preferred to filter the polymethacrylic acid sheathed vinyl acetate copolymer particles and collect them as a wet cake which is then treated with the organic amine to effect neutralization of the polymethacrylic acid carboxyl groups. However, this technique is by no means de rigeur and the amine can therefor be added to the non-aqueous dispersion of sheathed vinyl acetate copolymer, or one can even isolate and dry the latter and neutralize the dried resin with the amine.

Conventional equipment for carrying out the polymerization, neutralization, recovery and drying steps known to those skilled in the art can be used.

The compositions prepared by the instant invention can include such additives as pigments, colorants, opacifiers, lubricants, fillers, extenders, antioxidants, fungicides, heat and light stabilizers, and the like without materially effecting the physical chemical properties of the composition.

The sheathing effect was demonstrated by examining particles of vinyl acetate/di-2-ethylhexyl fumurate onto which methacrylic acid had been polymerized dispersed in aqueous ammonium hydroxide with a phase contrast microscope. The light shaded periphery of neutralized polymethacrylic acid can be clearly seen on several of the particles surrounding the core of vinyl acetate/di-2-ethylhexyl fumarate copolymer in the Figure which is a photomicrograph of the dispersion.

The invention is further described in the Examples which follow. All parts and percentages are by weight unless otherwise specified.

EXAMPLE 1

A four-neck 5 liter glass jacketed resin kettle equipped with a stirrer, reflux condenser, thermometer, addition funnel and nitrogen gas inlet tube was charged with 1,339.2 grams of vinyl acetate, 3.6 grams of distilled water, 28.8 grams of di-2-ethylhexyl fumarate, and 920.4 grams of n-hexane. The resin kettle was purged free of air with nitrogen and heated to 60°C at which point 6.6 grams of tertiary butyl peroxy pivalate was added. Polymerization was allowed to continue at the reflux temperature of this mixture which was in the range of 62.5° to 68.5°C over a period of 1.5 to 2 hours. By this time a haze had developed in the reaction mixture. Then a mixture of 36 grams of n-hexane and 72 grams of methacrylic acid was added rapidly over a period of 3 to 4 seconds while agitation and heating was continued. Polymerization was allowed to proceed at the reflux temperature of the mixture for 40 minutes after which time the contents of the flask were cooled. The reaction mixture was then thinned to a solids content of about 55% by adding 218 grams of n-hexane.

The solid copolymer containing an outer covering of polymethacrylic acid was recovered from the dispersion by filtration under vacuum. For every 50 grams of copolymer present, 5.38 grams of n-tributyl amine was blended therewith by treating the filter cake when damp, effecting the formation of a salt. The salt thus obtained was stored as a dry, free-flowing powder which upon stirring into water afforded a stable latex. The stable latex was cast onto a glass plate and dried to an even, continuous film.

EXAMPLE 2

When Example 1 is repeated with the exception that the di-ethylhexyl fumarate is replaced by an equivalent amount of di-tridecyl fumarate, a comparable copolymer salt powder is obtained.

EXAMPLE 3

When Example 1 is repeated with the exception that the tri-n-butyl amine is replaced by an equivalent amount of tri-n-octylamine, a comparable copolymer salt powder is obtained.

EXAMPLE 4

When Example 1 is repeated with the exception that an equivalent amount of tetramethyl ethylene diamine is substituted for the n-tributyl amine, a comparable copolymer salt powder is obtained.

CONTROL A

When Example 1 was repeated with the exception that an equivalent amount of morpholine was substituted for the n-tributyl amine, the copolymer salt agglomerated into larger particles rather into a free flowing powder and could not be readily converted to a latex with water.

CONTROL B

When Example 1 was repeated with the exception that an equivalent amount of monoethanolamine was substituted for the n-tributyl amine, the copolymer salt was not a free-flowing powder and could not be readily converted to a latex with water.

Although the invention has been described in its preferred forms with a certain degree of particularity, it is understood that the present disclosure has been made only by way of example and that numerous changes can be made without departing from the spirit and scope of the invention.

What is claimed is:

1. A method of preparing vinyl acetate polymers in a powder form which are readily converted to stable latices by addition of water which comprises:
   a. rapidly adding with agitation, in one continuous operation about 3 to about 8 parts by weight of methacrylic acid to a stable non-aqueous dispersion containing 100 parts by weight of a vinyl acetate/dialkyl fumarate copolymer having about 0.5 to 6 percent by weight of dialkyl fumarate, copolymerized therein, wherein the alkyl groups contain about 8 to about 18 carbon atoms, in an organic diluent selected from the class consisting of aliphatic hydrocarbons containing from about 4 to about 12 carbon atoms and alicyclic hydrocarbons containing from about 5 to about 8 carbon atoms, at a temperature of about 20° to about 150°C. in the presence of a polymerization initiating amount of a free radical polymerization initiator;
   b. maintaining a temperature of about 20°C to about 150°C for at least about 5 minutes whereby methacrylic acid is polymerized onto the surface of the vinyl acetate/dialkyl fumarate copolymer;
   c. neutralizing the carboxyl groups of the methacrylic acid with about a stoichiometric amount of an organic amine selected from the group consisting of (1) trialkyl-amines having the formula

wherein each of $R_1$, $R_2$ and $R_3$ is an alkyl group having about 4 to about 10 carbon atoms, (2) tetraalkyl alkylene diamines having the formula

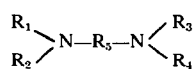

wherein each of $R_1$, $R_2$ and $R_3$ is as described above, $R_4$ is an alkyl group having about 4 to about 10 carbon atoms and $R_5$ is an alkylene radical having about 2 to about 10 carbon atoms and (3) a diamine having the formula $$H_2N-R_5-NH_2$$

wherein $R_5$ is as defined above; and d. recovering and drying the resultant product.

2. Method claimed in claim 1 wherein the dialkyl fumarate is di-2-ethylhexyl fumarate.

3. Method claimed in claim 1 wherein the organic amine is a trialkyl amine.

4. Method claimed in claim 3 wherein the trialkyl amine is n-tributyl amine.

5. Method claimed in claim 3 wherein the trialkyl amine is n-trioctyl amine.

6. Method claimed in claim 1 wherein the organic amine is a tetraalkyl alkylenediamine.

7. Method claimed in claim 6 wherein the tetraalkyl alkylenediamine is tetramethyl ethylenediamine.

8. Method claimed in claim 1 wherein the free radical polymerization initiator is t-butylperoxy pivalate.

9. Method claimed in claim 1 wherein the temperature in step (a) is maintained in the range of about 55°–75°C.

* * * * *